United States Patent
Park et al.

(10) Patent No.: US 11,886,197 B2
(45) Date of Patent: Jan. 30, 2024

(54) ELECTRONIC DEVICE FOR PREVENTING SPILLING OF LIQUID DURING MOVEMENT

(71) Applicant: SAMSUNG ELECTRONICS CO., LTD., Suwon-si (KR)

(72) Inventors: Dongwoo Park, Suwon-si (KR); Joonyoung Kim, Suwon-si (KR); Boseok Moon, Suwon-si (KR); Hyunjoong Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 398 days.

(21) Appl. No.: 17/367,014

(22) Filed: Jul. 2, 2021

(65) Prior Publication Data

US 2021/0341937 A1 Nov. 4, 2021

Related U.S. Application Data

(63) Continuation of application No. PCT/KR2020/005508, filed on Apr. 27, 2020.

(30) Foreign Application Priority Data

May 21, 2019 (KR) .................. 10-2019-0059683
Jan. 13, 2020 (KR) .................. 10-2020-0004487

(51) Int. Cl.
  *G05D 1/02* (2020.01)
  *G01H 13/00* (2006.01)
(52) U.S. Cl.
  CPC ........... *G05D 1/0223* (2013.01); *G01H 13/00* (2013.01)
(58) Field of Classification Search
  CPC ................. G05D 1/0223; G01H 13/00
  See application file for complete search history.

(56) References Cited

U.S. PATENT DOCUMENTS 7,269,479 B2  9/2007  Okamoto et al.
9,440,265 B2  9/2016  Yamada et al.
(Continued)

FOREIGN PATENT DOCUMENTS

JP        3910157 B2    2/2007
JP     2007-260838 A   10/2007
(Continued)

OTHER PUBLICATIONS

International Search Report (PCT/ISA/210) dated Aug. 10, 2020 issued by the International Searching Authority in International Application No. PCT/KR2020/005508.
(Continued)

*Primary Examiner* — Ramsey Refai
(74) *Attorney, Agent, or Firm* — Sughrue Mion, PLLC

(57) ABSTRACT

An electronic device and a method of driving the same are provided. The electronic device includes a container; a sensor; a driving unit; and a processor configured to: based on sensing data received through the sensor, measure, at a predetermined time interval, external forces exerted on the electronic apparatus from a ground on which the electronic apparatus is located, identify, based on frequency characteristics of the external forces and a natural vibration frequency of a liquid contained in the container, a frequency having frequency characteristics corresponding to the natural vibration frequency among frequencies of the external forces, and input a driving signal to the driving unit, based on a size of the identified frequency, the driving signal controlling a velocity of the electronic apparatus according to a natural vibration period of the liquid.

15 Claims, 14 Drawing Sheets

(56) References Cited

U.S. PATENT DOCUMENTS

| | | | |
|---|---|---|---|
| 2008/0283537 A1 | 11/2008 | Smith et al. | |
| 2016/0081505 A1 | 3/2016 | Berg | |
| 2017/0009408 A1* | 1/2017 | Marsolek | E01C 23/065 |
| 2017/0011442 A1 | 1/2017 | Hu et al. | |

FOREIGN PATENT DOCUMENTS

| | | |
|---|---|---|
| JP | 2009-259264 A | 11/2009 |
| JP | 2011-5608 A | 1/2011 |
| JP | 2016-68233 A | 5/2016 |
| KR | 10-2011-0096706 A | 8/2011 |
| KR | 10-1329291 B1 | 11/2013 |
| KR | 10-1371656 B1 | 3/2014 |

OTHER PUBLICATIONS

Written Opinion (PCT/ISA/237) dated Aug. 10, 2020 issued by the International Searching Authority in International Application No. PCT/KR2020/005508.

Sim et al., "Design of Tank Velocity Based on Multi-Mode natural Frequencies for Suppression of Sloshing", The Korean Society of Mechanical Engineers, Transactions of the Korean Society of Mechanical Engineers-B vol. 41No. 5, ISSN 2288-5324 (Online), Feb. 13, 2017, (11 total pages).

Hyeon et al., "Experimental Study on Sloshing in Rectangular Tank with Vertical Porous Baffle", Journal of Ocean Engineering and Technology 29(4), ISSN (online) 2287-6715, Aug. 2015, (10 pages).

Kim et al., "Velocity profile design of liquid tank considering sloshing natural frequencies", The Korean Society of Manufacturing Technology Engineers, 2013, (2 pages).

Wang, Zhu-yao, "Why does Coffee Spill While Walking?", Solutions of IYPT Problems, 2015 Problem 17: Coffee Cup, (6 total pages).

Pridgen et al., "Slosh Suppression by Robust Input Shaping", 49th IEEE Conference on Decision and Control, Dec. 15-17, 2010, Atlanta, Georgia, George W. Woodruff School of Mechanical Engineering Georgia Institute of Technology, (6 pages).

* cited by examiner

ELECTRONIC DEVICE FOR PREVENTING SPILLING OF LIQUID DURING MOVEMENT

CROSS-REFERENCE TO RELATED APPLICATION(S)

This application is a bypass continuation application of PCT International Application No. PCT/KR2020/005508, filed on Apr. 27, 202, which is based on and claims priority under 35 U.S.C. § 119 to Korean Patent Application No. 10-2019-0059683, filed on May 5, 2019, and Korean Patent Application No. 10-2020-0004487, filed on Jan. 13, 2020, in the Korean Intellectual Property Office, the disclosure of which is incorporated by reference herein in its entirety.

BACKGROUND

1. Field

The disclosure relates to an electronic apparatus provided with means of transportation. More particularly, the disclosure relates to an electronic apparatus capable of safely transporting an open container containing a liquid.

2. Description of Related Art

Liquids may be expressed as a pendulum system, a mass-spring-damper system, or the like. In other words, a surface of a liquid vibrates. There have been attempts to suppress the surface vibration of the liquid and prevent overflow of the liquid in the related arts.

As an example, there is a method of preventing liquid overflow by designing a container containing a liquid to perform circular motion through mechanical design modification. In addition, the liquid may be prevented from overflowing by actively controlling the container containing the liquid or a plate on which the container is placed through a motor, or the like, or installing a dynamic absorber that absorbs a specific frequency. However, these methods require many structural changes and additional work.

SUMMARY

Provided is an electronic apparatus capable of effectively preventing overflow of liquid by controlling a driving unit of the electronic apparatus based on external forces sensed through a sensor.

Also, provided is an electronic apparatus that controls a velocity so as not to deviate from a predetermined target path while minimizing vibration of a liquid due to external forces.

According to an aspect of the disclosure, there is provided an electronic apparatus including: a container; a sensor; a driving unit; and a processor configured to: measure, at a predetermined time interval based on sensing data received through the sensor, external forces exerted on the electronic apparatus from a ground on which the electronic apparatus is located, identify, based on frequency characteristics of the external forces and a natural vibration frequency of a liquid contained in the container, a frequency having frequency characteristics corresponding to the natural vibration frequency among frequencies of the external forces, and input a driving signal to the driving unit, based on a size of the identified frequency, the driving signal controlling a velocity of the electronic apparatus according to a natural vibration period of the liquid.

The processor is further configured to perform a Fast Fourier Transform (FFT) to the measured external forces at the predetermined time interval, and identify the frequency having a frequency within a predetermined range from the natural vibration frequency among the frequencies of the external forces.

The processor is further configured to, based on the size of the identified frequency being greater than or equal to a predetermined value, input the driving signal which enables the velocity of the electronic apparatus to change according to the natural vibration period of the liquid into the driving unit.

The processor is further configured to, based on the size of the identified frequency being greater than or equal to the predetermined value, identify a time point of a velocity change of the electronic apparatus based on the natural vibration frequency of the liquid, and input the driving signal which enables the velocity of the electronic apparatus to change at the identified time point of the velocity change into the driving unit.

The processor is further configured to: based on the size of the identified frequency being less than the predetermined value, input the driving signal to change the velocity of the electronic apparatus to a first velocity at a first time point, based on the size of the identified frequency being greater than or equal to the predetermined value, input the driving signal to change the velocity of the electronic apparatus to a second velocity at the first time point, and to the first velocity at a second time point after the first time point, wherein the second time point is a time point when a half of the natural vibration period of the liquid has passed from the first time point, and wherein the second velocity is a velocity between the velocity of the electronic apparatus immediately before the first time point, and the first velocity.

The processor is further configured to: measure the external forces exerted on the electronic apparatus based on the sensing data received through the sensor, predict a vibration of the liquid in the container by the measured external forces, and input the driving signal which causes the velocity of the electronic apparatus to change in order to reduce the predicted vibration, into the driving unit.

The processor is further configured to: identify a road surface condition of the ground based on the sensing data received through the sensor, identify an optimal velocity of the electronic apparatus that minimizes a vibration of the liquid among a plurality of velocities based on the road surface condition, and input the driving signal which causes the electronic apparatus to move at the identified optimal velocity, into the driving unit.

The processor is further configured to: based on the electronic apparatus moving at the plurality of velocities on the ground, identify each of the external forces exerted on the electronic apparatus based on the identified road surface condition, identify the size of the frequency having frequency characteristics corresponding to the natural vibration frequency among the identified external forces, and identify a smallest velocity among the plurality of velocities according to the identified frequency.

According to an aspect of the disclosure, there is provided a traveling method of an electronic apparatus for transporting a liquid, the traveling method including: measuring at a predetermined time interval based on sensing data received through a sensor, external forces exerted on the electronic apparatus from a ground on which the electronic apparatus is located; identifying, based on frequency characteristics of the external forces and a natural vibration frequency of the liquid contained in a container, a frequency having frequency characteristics corresponding to the natural vibration frequency among frequencies of the external forces; and based on a size of the identified frequency, controlling a velocity of the electronic apparatus according to a natural vibration period of the liquid.

The identifying the frequency includes performing a Fast Fourier Transform (FFT) to the measured external forces at the predetermined time interval, and identifying the frequency having a frequency within a predetermined range from the natural vibration frequency among the frequencies of the external forces.

The controlling the velocity includes, based on the size of the identified frequency being greater than or equal to a predetermined value, changing the velocity of the electronic apparatus according to the natural vibration period of the liquid.

The changing the velocity includes, based on the size of the identified frequency being greater than or equal to the predetermined value, identifying a time point of a velocity change of the electronic apparatus based on the natural vibration frequency of the liquid, and changing the velocity of the electronic apparatus at the identified time point of the velocity change.

The changing the velocity includes, based on the size of the identified frequency being less than the predetermined value, changing the velocity of the electronic apparatus to a first velocity at a first time point; and based on the size of the identified frequency being greater than or equal to the predetermined value, changing the velocity of the electronic apparatus to a second velocity at the first time point, and to the first velocity at a second time point after the first time point, wherein the second time point is a time point when a half of the natural vibration period of the liquid has passed from the first time point, and wherein the second velocity is a velocity between the velocity of the electronic apparatus immediately before the first time point, and the first velocity.

The method further includes: measuring the external forces exerted on the electronic apparatus based on the sensing data received through the sensor; predicting a vibration of the liquid in the container by the measured external forces; and changing the velocity of the electronic apparatus to reduce the predicted vibration.

The method further includes: identifying a road surface condition of the ground based on the sensing data received through the sensor; identifying an optimal velocity of the electronic apparatus that minimizes the predicted vibration of the liquid among a plurality of velocities based on the road surface condition; and changing the velocity of the electronic apparatus to the identified optimal velocity.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
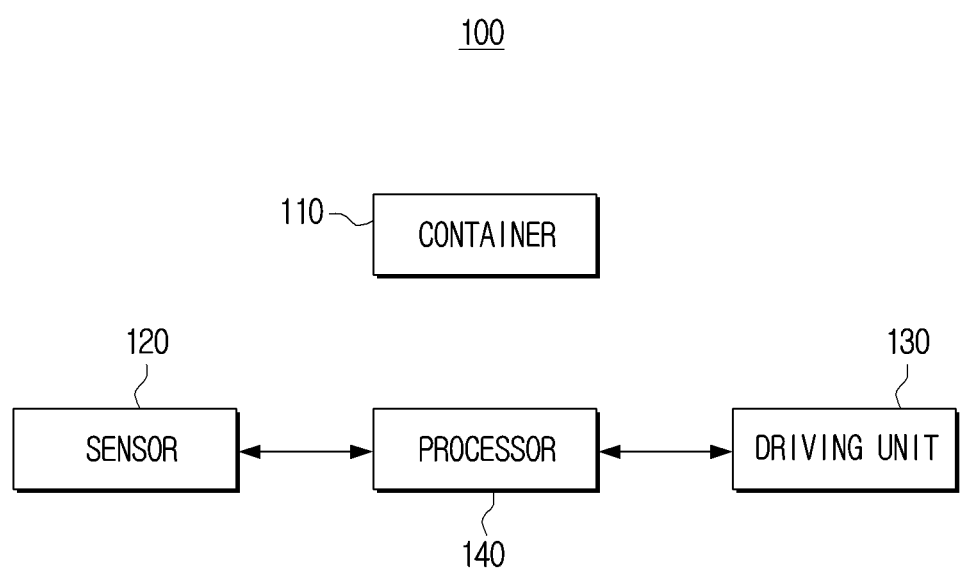
FIG. 1 is a block diagram illustrating a configuration of an electronic apparatus according to an embodiment.

Before specifically describing the present disclosure, a method for demonstrating the embodiments of the disclosure will be described.

First, as terms used in the present specification and claims, general terms have been selected by considering functions of various embodiments. However, such terms may be varied depending on an intention of those skilled in the art, a legal or technical interpretation, an emergence of a new technology, and the like. Also, there may be some terms arbitrarily selected by applicant. Such terms may be construed according to meanings defined in the present specification, and may also be construed based on general contents of the present specification and a typical technical concept in the art unless the terms are not specifically defined.

Also, the same reference numerals or symbols described in the attached drawings denote parts or elements that perform the same functions. For convenience of descriptions and understanding, the same reference numerals or symbols are used and described in different embodiments. In other words, although elements having the same reference numerals are all illustrated in a plurality of drawings, the plurality of drawings should not be construed as a single embodiment.

In addition, in order to distinguish between the components, terms including an ordinal number such as "first", "second", etc. may be used in the present specification and claims. The ordinal numbers are used in order to distinguish the same or similar elements from one another, and the use of the ordinal number should not be understood as limiting the meaning of the terms. For example, used orders, arrangement orders, or the like of elements that are combined with these ordinal numbers may not be limited by the numbers. The respective ordinal numbers are interchangeably used, if necessary.

The singular expression also includes the plural meaning as long as it does not differently mean in the context. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the exemplary embodiment of the present disclosure, the term "module," "unit," or "part" is referred to as an element that performs at least one function or operation, and may be implemented with hardware, software, or a combination of hardware and software. In addition, a plurality of "modules," a plurality of "units," a plurality of "parts" may be integrated into at least one module or chip except for a "module," a "unit," or a "part" which has to be implemented with specific hardware, and may be implemented with at least one processor.

Also, when any part is connected to another part, this includes a direct connection and an indirect connection through another medium. Further, when a certain portion includes a certain element, unless specifically indicated otherwise, this means that another element may be additionally included, rather than precluding another element.

FIG. 1 is a block diagram illustrating a configuration of an electronic apparatus according to an embodiment.

Referring to FIG. 1, the electronic apparatus 100 may include a container 110, a sensor 120, a driving unit 130, and a processor 140.

The container 110 is configured to contain various types of liquids. The container 110 may be an open container without a lid. The container 110 may be attached to the electronic apparatus 100, and the electronic apparatus 100 may be capable of moving while a liquid is contained in the container 110.

The sensor 120 is a component for measuring an external force exerted on the electronic apparatus 100 from various external elements. Specifically, when the electronic apparatus 100 is traveling, the sensor 120 may measure an external force exerted on the electronic apparatus 100 from a ground on which the electronic apparatus 100 is located. In addition, the sensor 120 may measure various types of external forces exerted on the front, side, rear, etc. of the electronic apparatus 100 when the electronic apparatus 100 is traveling.

For example, the sensor 120 may include an inertial measurement unit (IMU) composed of an acceleration sensor or the like. In addition, the sensor 120 may include a gyro sensor and/or may include various types of impact sensing sensors. In addition, the sensor 120 may include a motor sensor or the like for measuring an external force a form of torque or the like to a motor included in the driving unit 130 of the electronic apparatus 100.

The driving unit 130 is a component for controlling motion or movement of the electronic apparatus 100. For example, the driving unit 130 may control components or parts associated with transportation such as a wheel of the electronic apparatus 100. More specifically, the driving unit 130 may include a motor, and the driving unit 130 can drive the components or parts based on a driving signal input to the motor.

In addition, when the electronic apparatus 100 is implemented as a robot, the driving unit 130 may be electrically connected to a mechanical component that implements a physical movement of the robot to drive/control the corresponding component.

The processor 140 may be configured to control components included in the electronic apparatus 100.

The processor 140 may be implemented as a general-purpose processor such as a central processing unit (CPU), an application processor (AP), etc., a graphic dedicated processor such as a graphic processing unit (GPU), a vision processing unit (VPU), or an artificial intelligence dedicated processor such as a neural processing unit (NPU). In addition, the processor 140 may include a volatile memory such as SRAM.

The processor 140 may control a velocity of the electronic apparatus 100 by inputting a driving signal to the driving unit 130. In other words, the processor 140 may control the electronic apparatus 100 to move at a target velocity by inputting the driving signal corresponding to the target velocity to the driver 130.

However, when the processor 140 simply inputs a driving signal to the driving unit 130 based on the target velocity, vibration of the liquid may occur according to the external force exerted on the electronic apparatus.

Figure 2A:
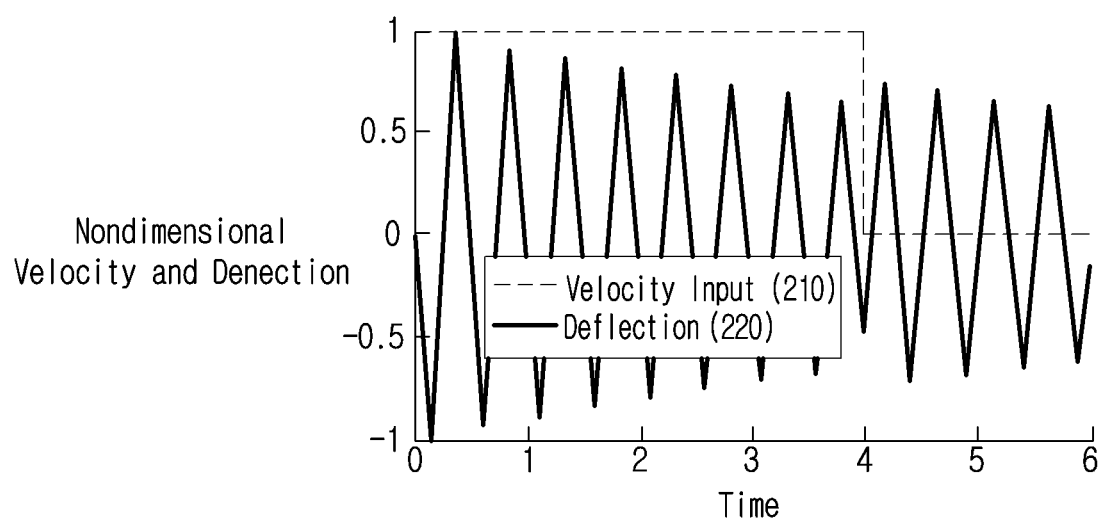
FIG. 2A is a graph schematically illustrating a degree of vibration of a liquid when an electronic apparatus changes a velocity without input shaping control.

In relation to this, FIG. 2A is a graph schematically illustrating a degree of vibration of a liquid when the electronic apparatus changes the velocity without input shaping control. In FIG. 2A, the velocity input 210 is a velocity of the electronic apparatus 100 according to the driving signal input to the driver 130 by the processor 140, and a deflection 220 means a vibration of the electronic apparatus 100 (or liquid in the container 110) according to the velocity input 210.

Referring to FIG. 2A, a vibration of a waveform such as the deflection 220 illustrated in FIG. 2A is generated by changing a velocity of the electronic apparatus 100 to target speeds '1' and '0' between a point of time 'time=0' and a point of time 'time=4'.

In FIG. 2A, a risk of shaking or overflowing the liquid due to the generated vibration may be very high.

The processor 140 according to an embodiment may input a driving signal to the driving unit 130 to change the velocity of the electronic apparatus 100 according to a natural vibration period of the liquid contained in the container 110, to solve the above-described problems.

In other words, the processor 140 may change the driving signal for changing the velocity of the electronic apparatus 110 to the target velocity little by little according to the natural vibration period of the liquid and input the driving signal to the driving unit 130, and this operation corresponds to a task of input shaping control.

Equation 1 below is an example of changing the velocity according to time for input shaping control.

$$\begin{bmatrix} t_i \\ A_i \end{bmatrix} = \begin{bmatrix} 0 & 0.5 T_d \\ \frac{1}{1+K} & \frac{K}{1+K} \end{bmatrix}, i = 1, 2 \qquad \text{Equation 1}$$

$$\text{where } K = e^{\frac{-\zeta w}{\sqrt{1-\zeta^2}}}$$

Equation 1 assumes that the target velocity at the time of 'time=0' is '1'. Referring to Equation 1, when performing input shaping control, the velocity may be controlled to be $1/(1+K)$ at the time of 'time=0', and the velocity may be controlled to be $K/(1+K)$ at the time of 'time=0.5 $T_d$' ($T_d$ is a natural vibration period of the liquid).

Moreover, the natural vibration period of the liquid contained in the container 110 may be calculated according to a shape of the container 110 and a capacity of the liquid.

For example, the natural vibration period may be calculated through Equation 2 below. However, the natural vibration period may be obtained in various ways by other methods or calculations.

$$W_{cylinder} = \sqrt{\frac{gv}{R}\tanh\left(v\frac{(H)}{R}\right)}$$
$$W_{square} = \sqrt{\frac{g\pi}{L}\tanh\left(\frac{\pi H}{L}\right)}$$

Equation 2 where w is natural frequency, g is gravitational acceleration, R is radius of cup (container), v is first zero of the derivative of the Bessel function, H is height of liquid, and L is depth of the cup (container).

The natural vibration period of the liquid contained in the container 110 may be a predetermined value through Equation 2 or the like. Alternatively, as a result of setting the type and/or capacity of the liquid contained in the container 110 according to a user input received from the electronic apparatus 100, the processor 140 may calculate the natural vibration period.

Figure 2B:
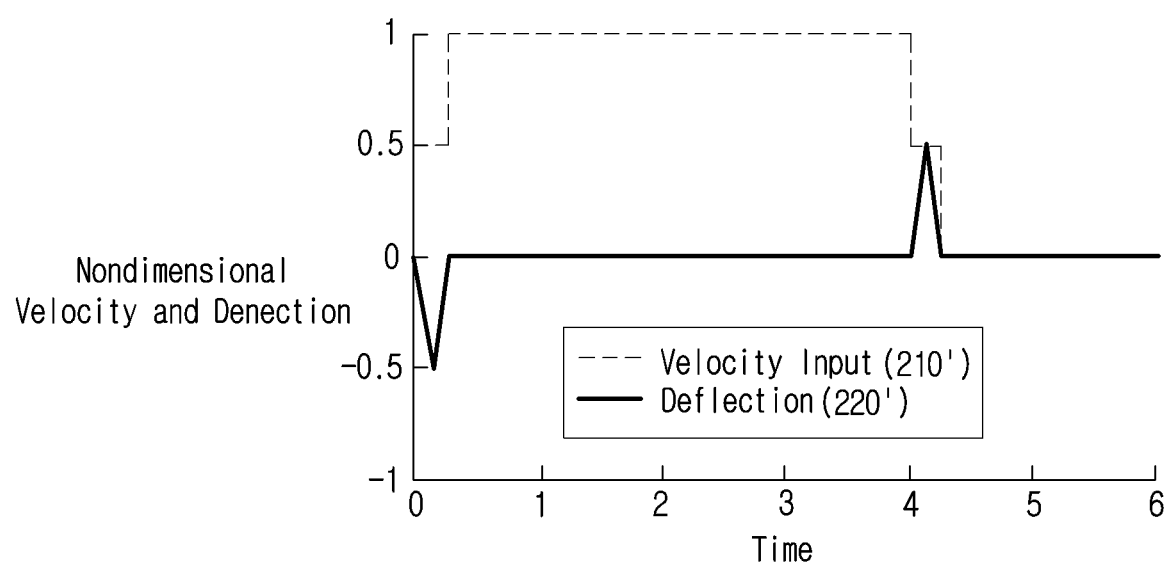
FIG. 2B is a graph schematically illustrating a degree of vibration of a liquid when the electronic apparatus changes a velocity through input shaping control.

FIG. 2B is a graph schematically illustrating a degree of vibration of a liquid when the electronic apparatus changes a velocity through input shaping control.

In FIG. 2B, referring to the velocity input 210', the velocity of the electronic apparatus 100 is slightly different from that of FIG. 2A according to the input shaping control of the processor 140.

Specifically, the velocity of the electronic apparatus 100 does not immediately become a target velocity of '1' at the time of 'time=0', but only rises to '0.5', and may become '1' at the time when half of the natural vibration period of the liquid in the container 110 has passed. In addition, the velocity of the electronic apparatus 100 does not immediately become '0', which is the target velocity at the time of 'time=4', but only decreases to '0.5', and then '0' at the time when half of the natural vibration period has passed.

As a result, referring to the deflection 220' of FIG. 2B, vibration of the electronic apparatus 100 (or liquid in the container 110) may be significantly reduced compared to FIG. 2A.

However, when the input shaping control is continued, the velocity of the electronic apparatus 100 has a difference from the target velocity at each point of time as illustrated in FIG. 2B. In other words, there is a problem that an error of a moving path increases as the time for the input shaping control to be performed increases.

Accordingly, the processor 140 according an embodiment may perform the input shaping control described above only when an external force exerted on the electronic apparatus 100 from the ground.

A corresponding point of time may mean a point in time when a size of the element corresponding to the natural frequency of the liquid contained in the container 110 among one or more elements included in the external forces exerted on the electronic apparatus 100 from the ground becomes larger than a predetermined value.

In order to identify the appropriate time, while the electronic apparatus 100 is moving, the processor 140 may measure an external force exerted on the electronic apparatus 100 from the ground where the electronic apparatus 100 is located, based on a sensing data received through the sensor 110 for each time period.

Specifically, among the sensing data received through the sensor 110, an external force exerted on the electronic apparatus 100 in a vertical direction from the ground may be measured at a predetermined time interval.

In addition, the processor 140 may identify an element (or frequency) having a frequency characteristic corresponding to a natural frequency among external forces based on the measured frequency characteristics of the external force for each time and the natural vibration frequency of the liquid contained in the container 110 (e.g., reciprocal of the natural vibration period).

For example, the processor 140 may perform discrete Fourier transform (DFT) on the measured external force for each time. Specifically, the processor 140 may identify an element having a frequency within a predetermined range from the natural vibration frequency among the measured external forces by performing a Fast Fourier Transform (FFT) on the measured external force for each time.

Figure 3:
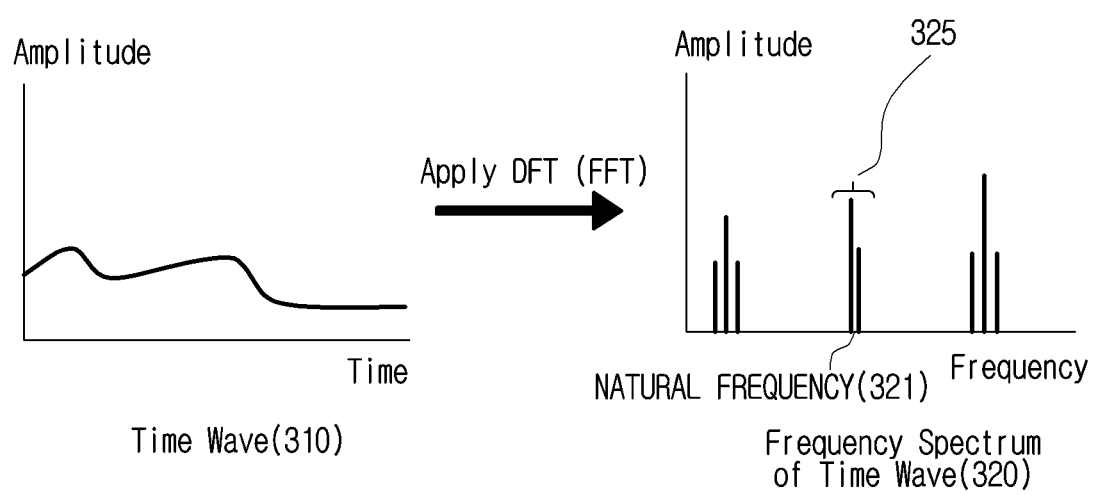
FIG. 3 is a view illustrating an example in which an electronic apparatus of the disclosure frequency converts an external force measured at each time interval to identify an element within a predetermined range from a natural frequency.

FIG. 3 is a view illustrating an example in which an electronic apparatus performs frequency conversion on an external force measured at each time interval to identify an element within a predetermined range from a natural frequency.

Referring to FIG. 3, the processor 140 may obtain a frequency spectrum 320 by performing FFT on the measured external force 310 for each time.

In this case, the processor 140 may identify elements 325 within a predetermined frequency range from the natural frequency 321 of the liquid contained in the container 110.

Further, based on the size of the identified element, the processor 140 may input a driving signal to the driving unit 130 to change the velocity of the electronic apparatus 100 according to the natural vibration period of the liquid. In other words, the processor 140 may perform the aforementioned input shaping control based on the size of the identified element.

Specifically, when the size (e.g., amplitude) of at least one of the identified elements 325 is equal to or greater than the predetermined value, the processor 140 may perform the aforementioned input shaping control.

Here, the processor 140 may identify a point of time of a velocity change of the electronic device 100 based on the natural vibration period of the liquid, and input a driving signal for changing the velocity of the electronic apparatus 100 at the identified point of time of change of the velocity to the driving unit 130.

In other words, the processor 140 may not only change the velocity of the electronic apparatus 100 at the target point of time corresponding to the target velocity, but also change the velocity of the electronic apparatus 100 at the point of time when half of the natural vibration period of the liquid has passed from the target point in time or when half of the natural vibration period is earlier than the target point in time.

Specifically, when the size of the identified main element is less than a predetermined value, since the input shaping control is not performed as in FIG. 2A by deactivating input shaping mode, the processor 140 may input a driving signal that causes the velocity of the electronic apparatus 100 to become a first velocity (e.g., target velocity) at a first time (e.g., target time).

Moreover, when the size of the identified element is greater than or equal to a predetermined value, since the input shaping control is performed as shown in FIG. 2B by activating the input shaping mode, the processor 140 may input a driving signal that allows the velocity of the electronic apparatus 100 to become a second velocity at a first point of time and a first velocity at a second point of time after the first point of time. In this case, the second point in time is a point in time that half of the natural vibration period of the liquid has passed from the first point in time, and the second velocity is a velocity between the velocity of the electronic apparatus immediately before the first point in time and the first velocity.

Generally, when the element (or component) corresponding to the natural vibration frequency of the liquid increases according to the external forces exerted from the ground, it has a great influence on the vibration of the liquid. Thus, the electronic apparatus 100 according to the embodiment described above may selectively perform input shaping control only when the vibration of the liquid increases, thereby effectively reducing the vibration of the liquid and minimizing deviation from a predetermined movement path.

Figure 4A:
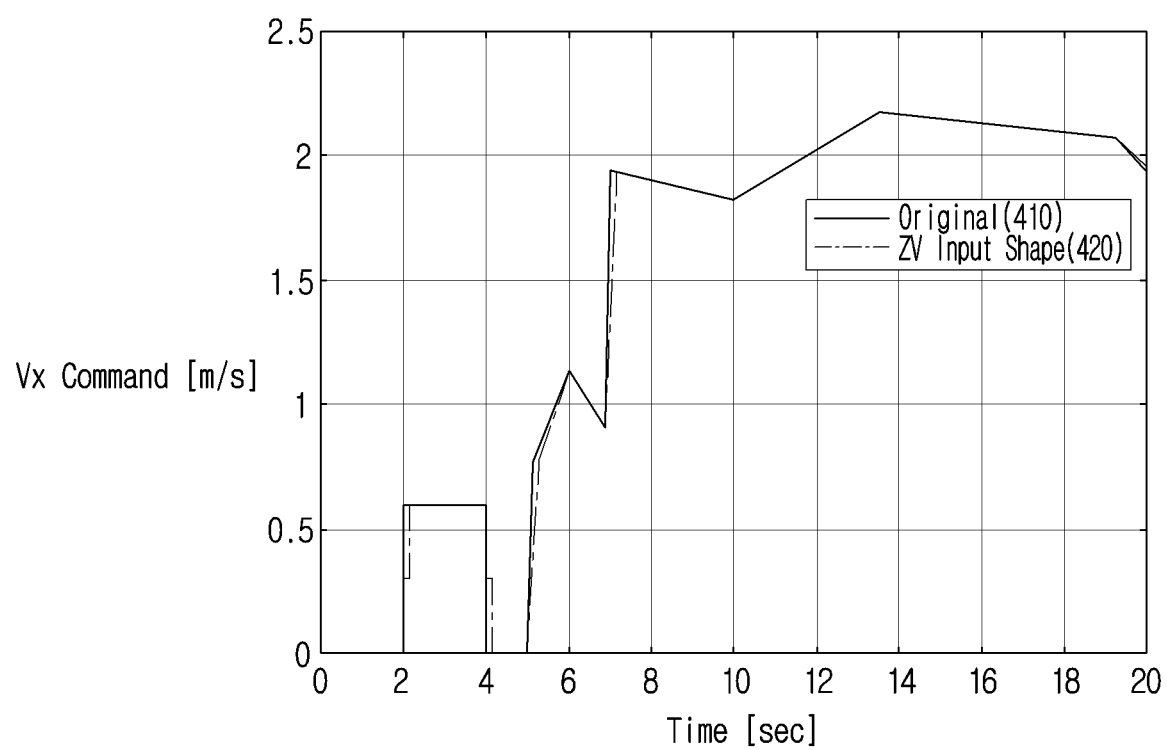
FIGS. 4A to 4B are graphs illustrating a difference in velocity change in a case when an electronic apparatus of the disclosure continuously performs input shaping control and when the electronic apparatus performs an input shaping control according to a size of an identified element.
Figure 4B:
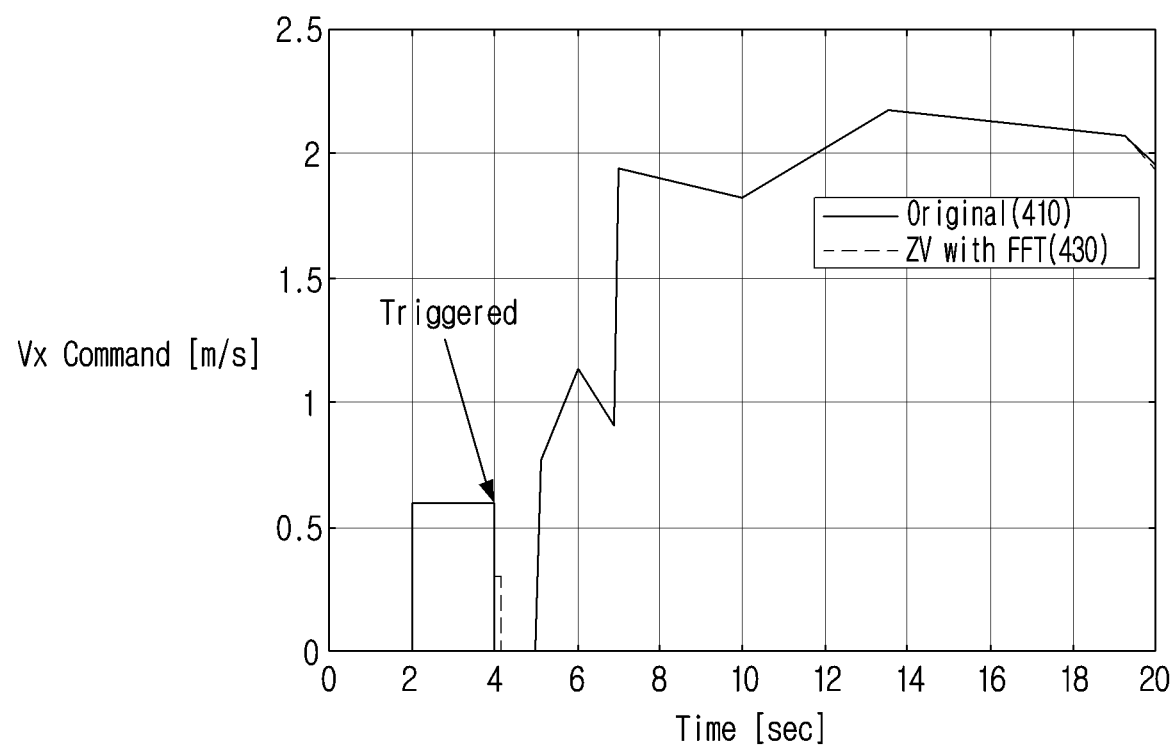

FIGS. 4A to 4B are graphs illustrating a difference in velocity change in a case when an electronic apparatus of the disclosure continuously performs input shaping control and when the electronic apparatus performs an input shaping control according to a size of an identified element;

In FIGS. 4A and 4B, an original 410 represents a target velocity at each time interval of the electronic apparatus 100 in a state in which there is no input shaping control.

In FIG. 4A, a ZV input shape 420 represents a velocity of the electronic apparatus 100 for each time interval when continuous input shaping control is performed.

Referring to FIG. 4A, as a result of the continuous input shaping control being performed irrespective of a frequency conversion, there is a difference between the original 410 and the ZV input shape 420 during a plurality of time periods at which the velocity changes.

In FIG. 4B, the ZV with FFT 430 represents a velocity of the electronic apparatus 100 at each time interval when input shaping control is performed according to the size of the identified element according to the frequency conversion. FIG. 4B assumes that as a result of performing FFT on the measured external force at each time interval, the size of the element corresponding to the natural vibration frequency of the liquid exceeds the predetermined value only near a point of 'time=4'.

Unlike the ZV input shape 420 of FIG. 4A in which continuous input shaping control is performed regardless of the frequency conversion, in the case of the ZV with FFT 430 of FIG. 4B, the input shaping control is performed only near the point at which the size of the element corresponding to the natural frequency exceeds the predetermined value, which is at 'time=4'.

As a result, unlike the ZV Input Shape 420 of FIG. 4A that shows a difference in velocity compared to the original 410 whenever the velocity changes, in the case of the ZV with FFT 430 of FIG. 4B, there is merely a slight difference from the original 410 only at the 'time=4' where the velocity decreases to '0', and has almost the same velocity as the original 410 at the remaining points of times.

Figure 5:
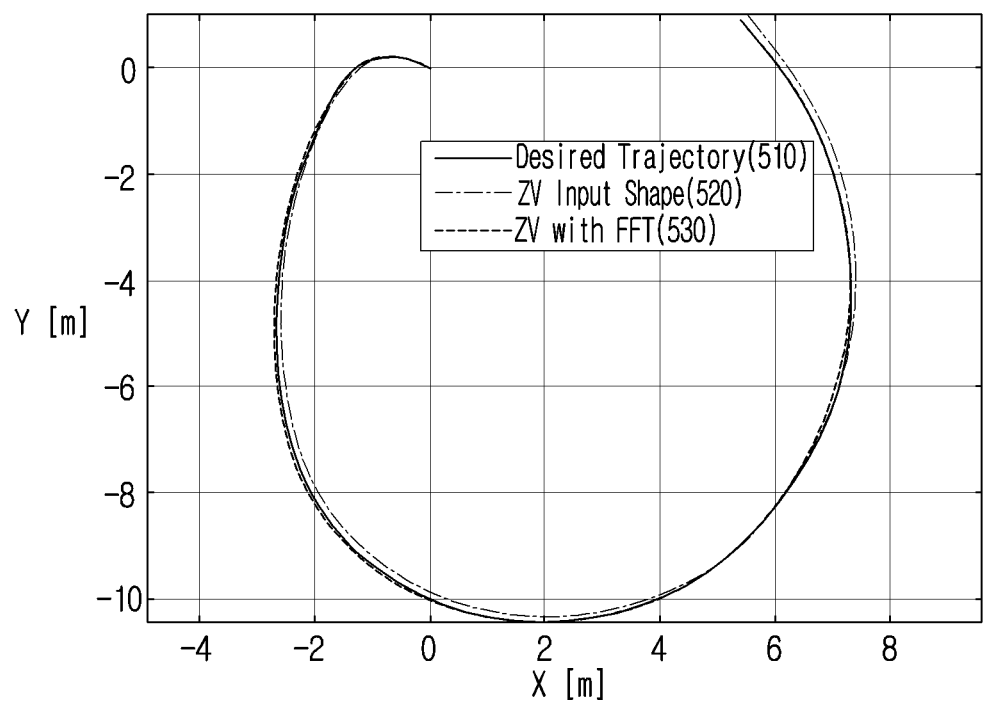
FIG. 5 is a graph illustrating an error of a moving path in a case when an electronic apparatus of the disclosure continuously performs input shaping control and when the electronic apparatus performs an input shaping control according to a size of an identified element.

Regarding the above, FIG. 5 is a graph illustrating an error of a moving path in a case when an electronic apparatus of the disclosure continuously performs input shaping control and when the electronic apparatus performs an input shaping control according to a size of an identified element.

Specifically, FIG. 5 illustrates locations 510, 520, and 530 of the electronic apparatus 100 for each time interval with respect to the original 410, the ZV input shape 420, and the ZV with FFT 430 of FIGS. 4A to 4B as (X, Y) coordinates.

In other words, FIG. 5 illustrates movement paths of the original 410, ZV input shape 420, and ZV with FFT 430 of FIGS. 4A to 4B.

Referring to FIG. 5, the ZV with FFT 530 has a movement path that is much closer to the original 510 compared to the ZV input shape 520. In other words, compared with the ZV input shape 520 in which the continuous input shaping control is performed, the ZV with FFT 530 significantly reduces the error in the moving path.

In addition to the embodiments described above with reference to FIGS. 2B to 5, the processor 140 according to an embodiment may control an instantaneous velocity change of the electronic apparatus 100 according to an external force measured in real time.

For this operation, the processor 140 may measure an external force applied to the electronic apparatus 100 based on sensing data received through the sensor 110 and predict a vibration of the liquid to be generated by the measured external force.

Figure 6:
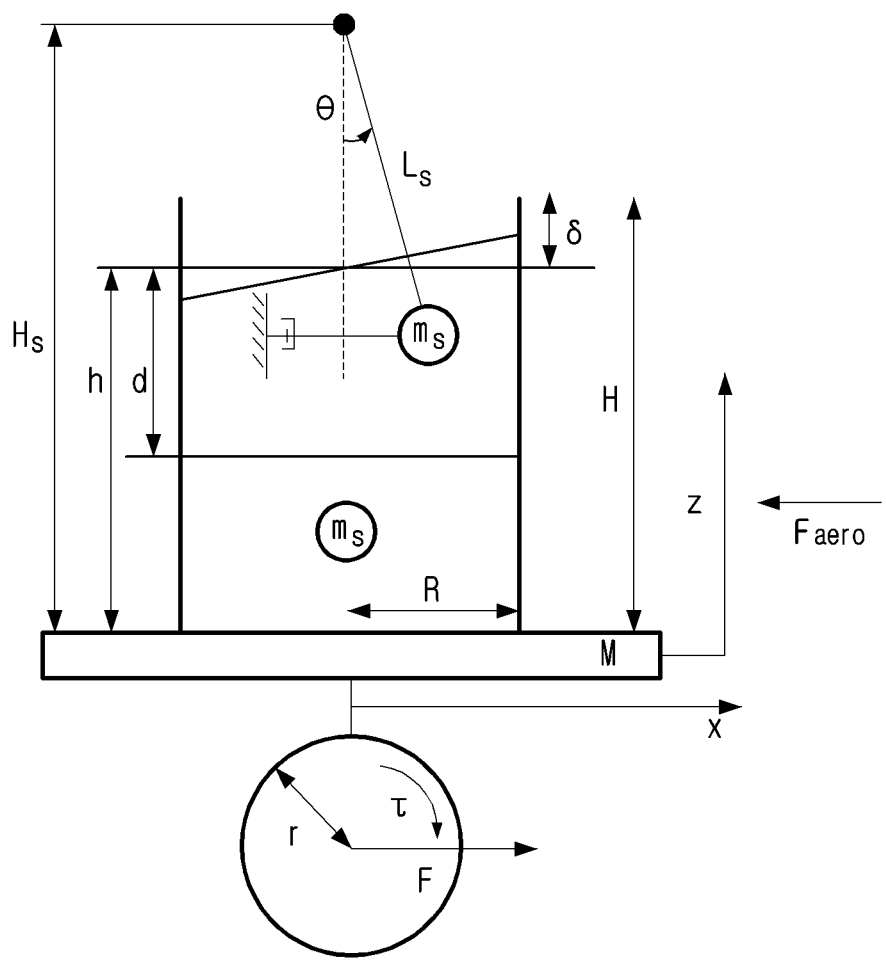
FIG. 6 is a view illustrating an example of modeling a physical characteristic of a liquid vibrating according to an external force.

FIG. 6 is a view illustrating an example of modeling a physical characteristic of a liquid vibrating according to an external force. FIG. 6 is an example of using a method of modeling by treating a vibration of a liquid in the container 110 as a vibration of a pendulum among conventionally known modeling methods.

A relationship between the elements illustrated in FIG. 6 may be established through the following equations.

$$f_S = \frac{1}{2\pi}\sqrt{\left(1.841\frac{g}{R}\tanh\left(1.841\frac{h}{R}\right)\right)} \quad \text{Equation 3}$$

$$m_S = m\frac{R}{2.199h}\tanh\left(1.841\frac{h}{R}\right)$$

$$H_S = h - \frac{R}{1.841}\left(\tanh\frac{0.9205h}{R} - \operatorname{csch}\frac{1.841h}{R}\right)$$

where m is total mass($=m_f+m_s$), $m_s$ is slosh mass, R is radius of container, h is fill level, and $H_s$ is distance between pendulum hinge point location and base of container.

The following equations may be derived.

$$-\frac{c}{L_S}\theta'\cos\theta - T\sin\theta = m_S\left(x'' + L_S\theta''\cos\theta - L\theta'^2\sin\theta\right) \quad \text{Equation 4}$$

$$T\cos\theta - \frac{c}{L_S}\theta'\sin\theta - m_S g = m_S\left(L\theta''\sin\theta + L_S\theta'^2\cos\theta\right)$$

$$F + \frac{c}{L_S}\theta'\cos\theta + T\sin\theta = (M + m_f)x''$$

where T is tension force on pendulum model, if T is eliminated, $$(M + m_S)x'' m_S L_S\left(\theta'^2\sin\theta - \theta''\cos\theta\right) + F \quad \text{Equation 5}$$

$$m_S x''\cos\theta + mL_S\theta'' = -\frac{c}{L_S}\theta' - m_S g\sin\theta$$

Here, an air resistance may be defined as follows.

$$F_{aero}\frac{1}{2}\rho C_d A_F(x' + V_{wind})^2 \quad \text{Equation 6}$$

where ρ is mass density of air, $C_d$ is aerodynamic drag coefficient, and $A_F$ is frontal area of vehicle (or an electronic apparatus).

When Equation 6 and Equation 5 are combined, the following equation is derived.

$$(M + m_S)x'' = m_S L_S(\theta'^2 \sin\theta - \theta'' \cos\theta) + F - F_{aero} \quad \text{Equation 7}$$

$$m_S x'' \cos\theta + m L_S \theta'' = -\frac{c}{L_S}\theta' - m_S g \sin\theta$$

In addition, acceleration in a front direction of the electronic apparatus 100 may be derived as follows.

$$x'' = \frac{m_S L_S \theta'^2 \sin\theta + m_S g \sin\theta\cos\theta + \frac{c}{L_S}\theta'\cos\theta + F - F_{aero}}{M + m_f + m_S \sin^2\theta} \quad \text{Equation 8}$$

Acceleration of each liquid may also be calculated as follows.

$$\theta'' = \frac{-m_S L_S \theta'^2 \sin\theta\cos\theta - \left(1 + \frac{M+m_f}{m_s}\right)\frac{c}{L_S}\theta' - (M + m_f + m_S)g\sin\theta - F\cos\theta + F_{aero}\cos\theta}{L_S(M + m_f + m_S \sin^2\theta)} \quad \text{Equation 9}$$

In addition, the processor 140 may input a driving signal that causes a velocity change of the electronic apparatus 100 to reduce a vibration of a predicted liquid model through the equations described above related to FIG. 6 to the driving unit 130.

As a specific example, the processor 140 may reduce the vibration of the liquid generated by an external force by inputting a driving signal corresponding to a driving force u as illustrated in Equation 10 below to a motor of the driving unit 130.

$$u = k_1\theta - k_2\theta' - k_3\theta'' \quad \text{Equation 10}$$

Here, $k_1$, $k_2$, and $k_3$ may be a positive constant number, and correspond to tuning parameters that may be derived by simulations, or the like.

In addition to the embodiments described above with respect to FIGS. 2B to 6, the processor 140 may generate a model of a road surface condition of the ground on which the electronic apparatus 100 is located and identify an optimal velocity that can reduce the vibration of the liquid.

The processor 140 may identify the road surface condition of the ground based on the sensing data received through the sensor 110.

Specifically, the processor 140 may identify a movement of the electronic apparatus 100 in a vertical direction from a flat surface corresponding to the ground based on the sensing data received through the sensor 110, and continuously generate a model the road condition in the vertical direction based on the identified movement according to the moving path of the electronic apparatus 100.

Alternatively, the processor 140 may identify a road surface condition based on an image captured by a camera.

Figure 7:
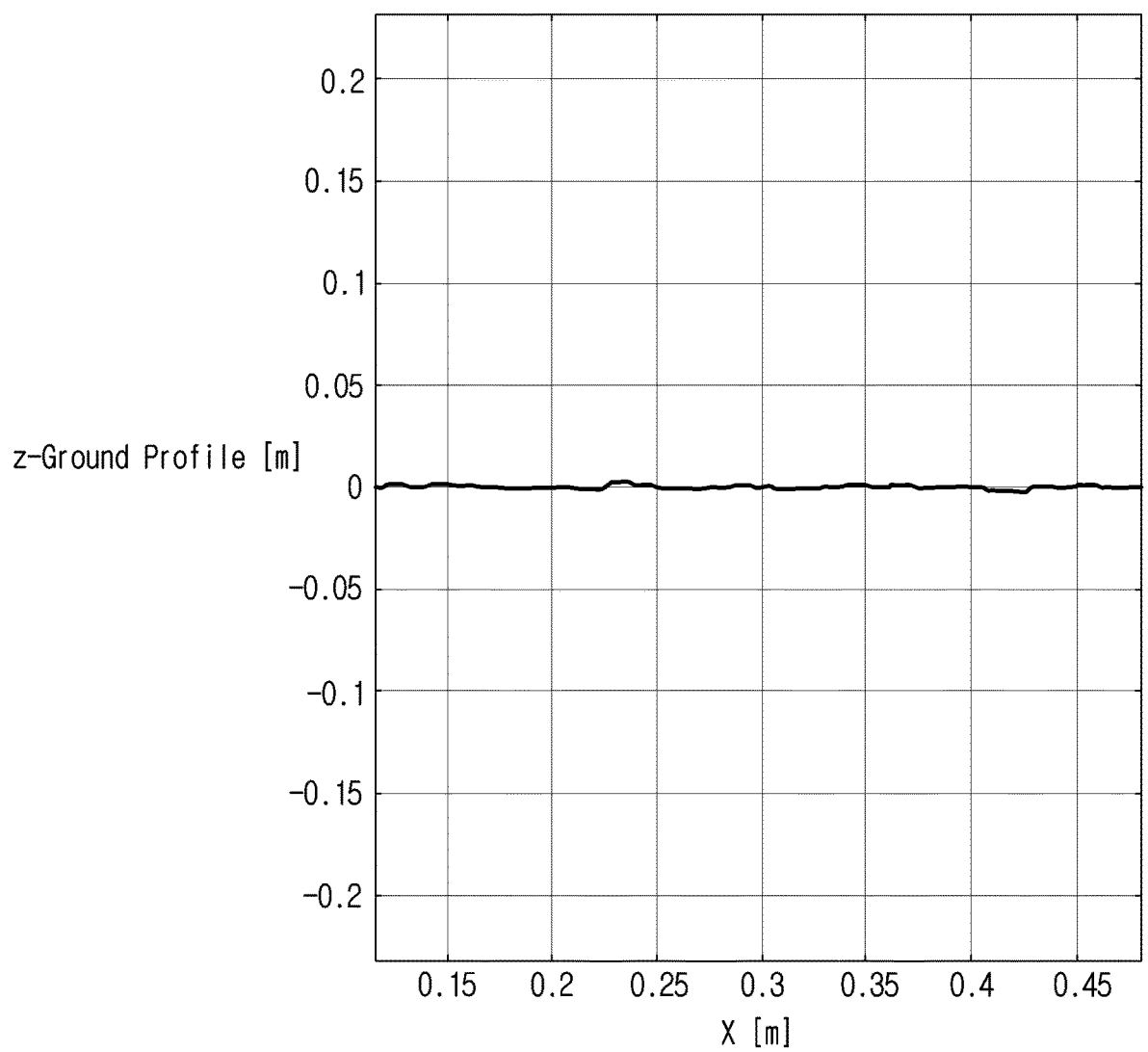
FIG. 7 is a graph illustrating an example of a road surface condition identified through a sensor by an electronic apparatus of the disclosure.

As a result, a road surface condition may be identified (or modeled) as illustrated in the graph of FIG. 7. Referring to FIG. 7, a road surface condition profile in a z direction (i.e., vertical direction) according to a movement path of the electronic apparatus 100 may be modeled.

For example, the processor 140 may identify the velocity of the electronic apparatus that minimizes the vibration of the liquid in the container 110 among a plurality of different velocities based on the identified road surface condition.

Specifically, the processor 140 may identify external forces to be exerted on the electronic apparatus 100 when the electronic device 100 moves at a plurality of different velocities on the ground based on the identified road surface condition. In addition, the processor 140 may identify a size of an element having a frequency characteristic corresponding to a natural frequency among the identified external forces.

Here, the processor 140 may identify a velocity having the smallest size of the identified element among the plurality of different velocities.

Figure 8:
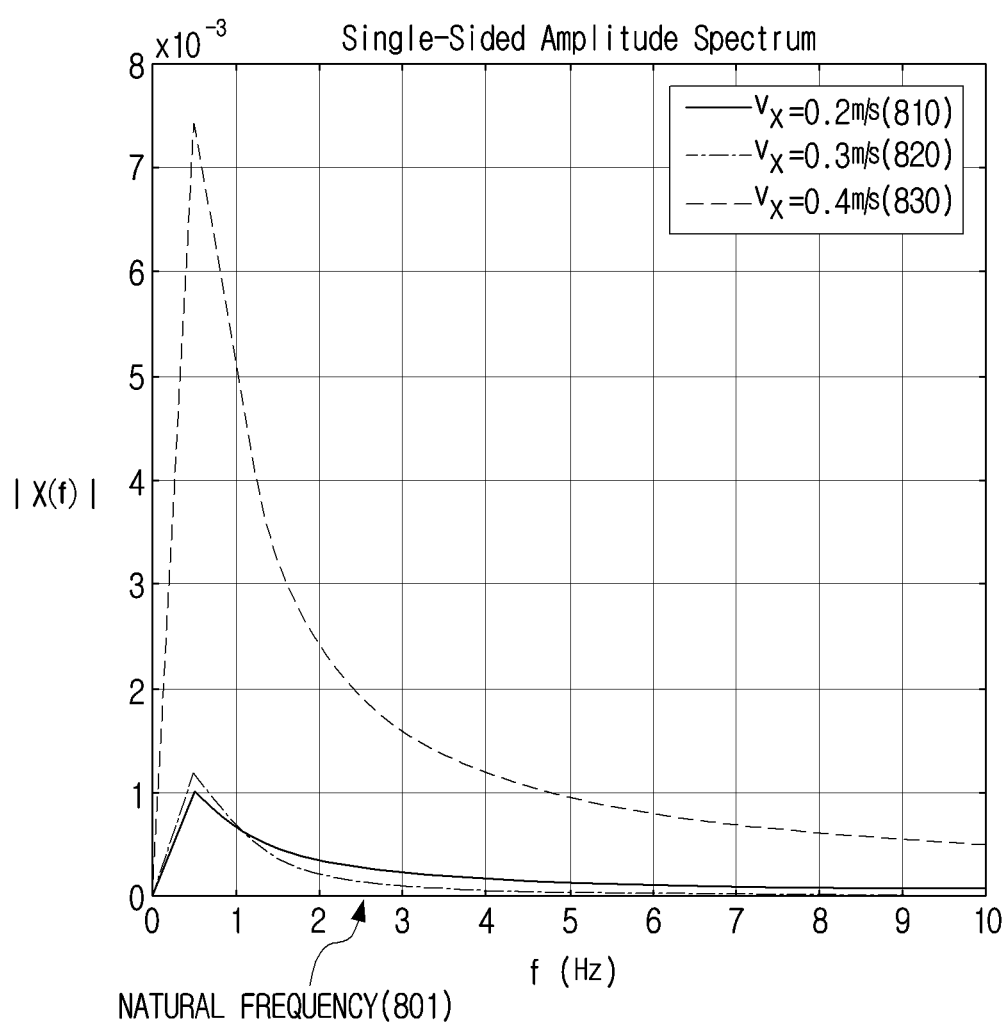
FIG. 8 is a graph illustrating an example in which an electronic apparatus of the disclosure identifies an optimum velocity according to a road surface condition.

In relation to this, FIG. 8 is a graph illustrating an example in which an electronic apparatus according to an embodiment identifies an optimum velocity according to a road surface condition.

FIG. 8 is graphs 810, 820, and 830 in which an external force for each time interval applied to the electronic apparatus 100 from the ground is frequency-converted (e.g., FFT) with respect to cases when the electronic apparatus 100 moves at 0.2 m/s, 0.3 m/s, and 0.4 m/s on the ground having the road surface condition of FIG. 7.

Referring to FIG. 8, the processor 140 may identify 0.3 m/s having the smallest difference from a natural frequency 801 of the liquid in the container 110 among the velocities (0.2 m/s, 0.3 m/s, and 0.4 m/s), as an optimum velocity.

In addition, the processor 140 may input a driving signal that allows the electronic apparatus 100 to move at the identified velocity among the velocities (0.2 m/s, 0.3 m/s, 0.4 m/s) to the driving unit 130.

According to the one or more embodiments described above with respect to FIGS. 2B to 8 may be independently performed by the processor 140.

The electronic apparatus 100 according to the one or more embodiments may prevent a liquid from spilling when transporting the liquid using the open container 110.

Figure 9:
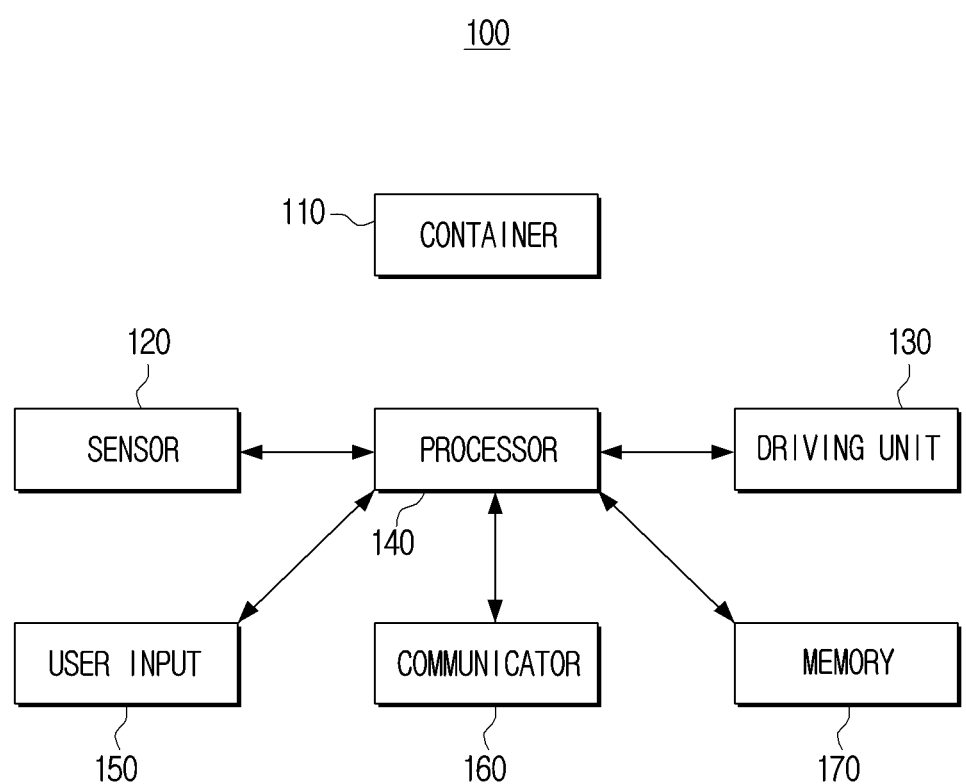
FIG. 9 is a block diagram illustrating a detailed configuration of an electronic apparatus according to an embodiment.

FIG. 9 is a block diagram illustrating a detailed configuration of an electronic apparatus according to an embodiment.

Referring to FIG. 9, the electronic apparatus 100 further includes a user input unit 150, a communicator 160, and a memory 170 in addition to the container 110, the sensor 120, the driving unit 130, and the processor 140.

The user input unit 150 is a component for receiving a user command. For example, the processor 140 may activate an input shaping mode according to a user command received through the user input unit 150. The input shaping mode activated according to the user command may be a mode for performing continuous input shaping control or a mode for performing selective input shaping control according to the size of an element identified according to FFT transformation.

The user input unit 150 may be implemented as a motion sensor such as a touch screen, a button, a microphone, or a camera, but is not limited thereto.

The communicator 160 is a component for directly/indirectly performing communication with at least one external electronic apparatus through wired communication and/or wireless communication.

Wired communication may include at least one of communication methods such as Ethernet, optical network, Universal Serial Bus (USB), Thunderbolt, or the like.

Wireless communication may include at least one of long-term evolution (LTE), LTE Advance (LTE-A), 5th generation (5G) mobile communication, code division multiple access (CDMA), wideband CDMA (WCDMA), universal mobile telecommunications system (UMTS), and Wireless Broadband (WiBro), Global System for Mobile Communications (GSM), Time Division Multiple Access (DMA), Wi-Fi, Wi-Fi Direct, Bluetooth, near field communication (NFC), Zigbee, or the like.

Here, the communicator 160 may include a network interface or a network chip according to the wired/wireless communication method described above. However, the communication method is not limited to the example described above, and may include a communication method newly emerging according to the development of technology.

The processor 140 may receive information on a user command from an external electronic apparatus through the communicator 160. For example, the user command may be input through an external electronic apparatus.

The processor 140 may perform at least some of the embodiments described above together with at least one external electronic apparatus connected through the communicator 160.

For example, the processor 140 may transmit information on the external force for each time interval measured through the sensor 110 to the server device. In this case, if information that a size of the element corresponding to the natural frequency of the liquid among the external force for each time interval is greater than or equal to a predetermined value is received through the communicator 160, the processor 140 may perform input shaping control.

The memory 170 is a component for storing an operating system (OS) for controlling the overall operation of the components of the electronic apparatus 100 and at least one instruction or data related to the components of the electronic apparatus 100.

The processor 140 may perform an operation according to the various embodiments described above by executing at least one instruction stored in the memory 170.

The memory 170 may include a nonvolatile memory such as a ROM, a flash memory, or the like, and may include a volatile memory formed of a dynamic random access memory (DRAM) or the like. In addition, the memory 170 may include a storage composed of a hard disk, a solid state drive (SSD), or the like.

Hereinafter, a traveling method of an electronic apparatus for transporting a liquid according to the disclosure will be described with reference to FIGS. 10 to 12.

Figure 10:
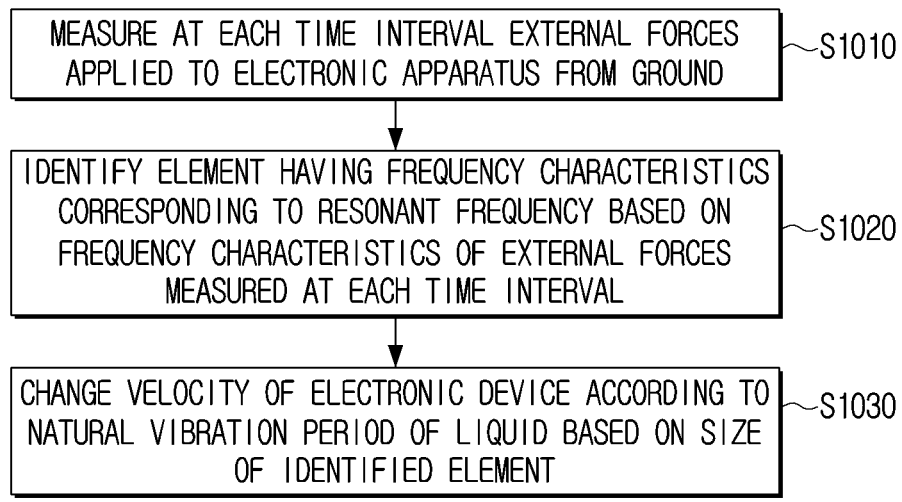
FIG. 10 is a flowchart illustrating a driving method of an electronic apparatus that transports a liquid according to an embodiment.

FIG. 10 is a flowchart illustrating a driving method of an electronic apparatus according to an embodiment.

Referring to FIG. 10, the traveling method may measure external forces exerted on the electronic apparatus from the ground on which the electronic apparatus is located for each time interval based on sensing data received through a sensor (S1010).

And, based on the measured frequency characteristics of the external force for each time interval and the natural vibration frequency of the liquid contained in the container, it may identify an element having a frequency characteristic corresponding to the natural frequency of the external force (S1020).

Specifically, it may identify an element having a frequency within a predetermined range from the natural vibration frequency of the external force by performing Fast Fourier Transform (FFT) on the measured external force for each time interval.

Based on a size of the identified element, a velocity of the electronic apparatus may be changed according to the natural vibration period of the liquid (S1030).

Specifically, when the size of the identified element is greater than or equal to a predetermined value, the velocity of the electronic apparatus may be changed according to the natural vibration period of the liquid.

In other words, when the size of the identified element is greater than or equal to the predetermined value, a time point of a velocity change of the electronic apparatus may be identified based on the natural vibration period of the liquid, and the velocity of the electronic apparatus may be changed at the point of time of the identified velocity change.

As a specific example, if the size of the identified element is less than the predetermined value, the velocity of the electronic apparatus may be changed to a first velocity at a first point of time, and if the size of the identified element is greater than or equal to the predetermined value, the velocity of the electronic apparatus may be changed to a second velocity at the first point of time, and the velocity of the electronic apparatus may be changed to the first velocity at the second point of time after the first point of time. In this case, the second point of time is a point of time that half of the natural vibration period of the liquid has passed from the first point of time, and the second velocity is a velocity between the velocity of the electronic apparatus immediately before the first point of time and the first velocity.

Figure 11:
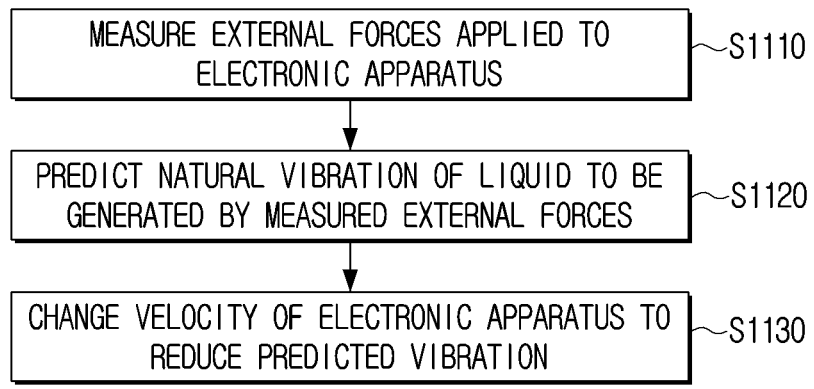
FIG. 11 is a flowchart illustrating a driving method of an electronic apparatus with an instantaneously measured external force according to an embodiment.

FIG. 11 is a flowchart illustrating a driving method of an electronic apparatus with an instantaneously measured external force according to an embodiment.

Referring to FIG. 11, the driving method may measure an external force exerted on an electronic apparatus based on sensing data received through a sensor (S1110).

The vibration of the liquid to be generated by the measured external force may be predicted. For example, a pendulum modeling method may be used to measure external forces (S1120).

In addition, the velocity of the electronic apparatus may be changed such that the predicted vibration is reduced (S1130).

Figure 12:
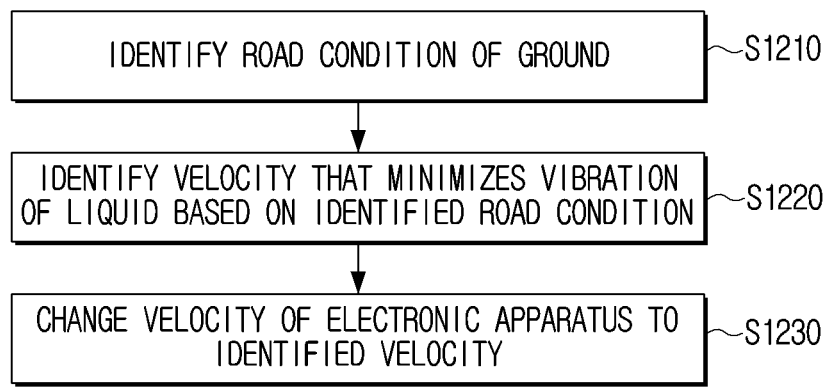
FIG. 12 is a flowchart illustrating an example in which a driving method identifies an optimum velocity according to a road surface condition of a ground, according to an embodiment.

FIG. 12 is a flowchart illustrating an example in which a driving method of an electronic apparatus identifies an optimum velocity according to a road surface condition of a ground, according to an embodiment.

Referring to FIG. 12, the driving method may identify a road surface condition of a ground based on sensing data received through a sensor (S1210). For example, the road surface condition may be identified based on an image acquired through a camera of the electronic apparatus. Here, the camera may be a depth camera.

Based on the road surface condition, the driving method may include identifying the velocity of the electronic apparatus that minimizes the vibration of the liquid among a plurality of different velocities (S1220).

Specifically, based on the identified road surface condition, when the electronic apparatus moves at each of the plurality of different velocities on the ground, each of the external forces to be applied to the electronic apparatus is identified, and each external force applied to the electronic apparatus may be identified, and a size of an element having a frequency characteristic corresponding to a natural frequency among the identified external forces may be identified.

For example, among the plurality of different velocities, a velocity having the smallest size of the identified element may be identified.

In addition, the velocity of the electronic apparatus may be changed to the identified velocity (S1230).

One or more embodiments of the driving method described above with reference to FIGS. 10 to 12 may be performed by the electronic apparatus 100 illustrated and described with reference to FIGS. 1 and 9.

Alternatively, the one or more embodiments of the driving method described with reference to FIGS. 10 to 12 may be performed by a system including the electronic apparatus 100 and at least one external electronic apparatus.

Various embodiments described above may be embodied in a recording medium that may be read by a computer or a similar apparatus to the computer by using software, hardware, or a combination thereof.

According to the hardware embodiment, exemplary embodiments that are described in the present disclosure may be embodied by using at least one selected from Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, electrical units for performing other functions.

In some cases, the embodiments described herein may be implemented in the processor 140 itself. In a software configuration, various embodiments described in the specification such as a procedure and a function may be embodied as separate software modules. The software modules may respectively perform one or more functions and operations described in the present specification.

According to various embodiments described above, computer instructions for performing processing operations of the electronic apparatus 100 according to the various embodiments described above may be stored in a non-transitory computer-readable medium. The computer instructions stored in the non-transitory computer-readable medium may cause a particular device to perform processing operations on the device according to the various embodiments described above when executed by the processor of the particular device.

The non-transitory computer readable recording medium refers to a medium that stores data and that can be read by devices. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The electronic apparatus according to one or more embodiments of the disclosure may control a driving unit of the electronic apparatus based on an external force sensed through a sensor when transporting a liquid. As a result, the electronic apparatus may effectively prevent overflow of the liquid. Particularly, the electronic apparatus according to one or more embodiments of the disclosure may minimize deviation from a predetermined target path while controlling a velocity to prevent vibration of the liquid due to an external force.

The foregoing embodiments and advantages are only examples and should not be construed as limiting the scope of the disclosure. The disclosure applied to other types of apparatuses. Also, the description of the embodiments is for the purpose of illustration only, and it may be apparent to one of ordinary skill in the art that various modifications, replacements, improvements and equivalents thereof may be made without departing from the scope of the disclosure.

What is claimed is:

1. An electronic apparatus comprising:
   a container;
   a sensor;
   a driving unit; and
   a processor configured to:
   based on sensing data received through the sensor, measure, at a predetermined time interval, external forces exerted on the electronic apparatus from a ground on which the electronic apparatus is located,
   identify, based on frequency characteristics of the external forces and a natural vibration frequency of a liquid contained in the container, a frequency having frequency characteristics corresponding to the natural vibration frequency among frequencies of the external forces, and
   input a driving signal to the driving unit, based on a size of the identified frequency, the driving signal controlling a velocity of the electronic apparatus according to a natural vibration period of the liquid.

2. The electronic apparatus of claim 1, wherein the processor is further configured to perform a Fast Fourier Transform on the measured external forces at the predetermined time interval, and identify the frequency having a frequency within a predetermined range from the natural vibration frequency among the frequencies of the external forces.

3. The electronic apparatus of claim 1, wherein the processor is further configured to, based on the size of the identified frequency being greater than or equal to a predetermined value, input the driving signal which enables the velocity of the electronic apparatus to change according to the natural vibration period of the liquid into the driving unit.

4. The electronic apparatus of claim 3, wherein the processor is further configured to, based on the size of the identified frequency being greater than or equal to the predetermined value, identify a time point of a velocity change of the electronic apparatus based on the natural vibration frequency of the liquid, and input the driving signal which enables the velocity of the electronic apparatus to change at the identified time point of the velocity change into the driving unit.

5. The electronic apparatus of claim 4, wherein the processor is further configured to:
   based on the size of the identified frequency being less than the predetermined value, input the driving signal to change the velocity of the electronic apparatus to a first velocity at a first time point,
   based on the size of the identified frequency being greater than or equal to the predetermined value, input the driving signal to change the velocity of the electronic apparatus to a second velocity at the first time point, and to the first velocity at a second time point after the first time point,
   wherein the second time point is a time point when half of the natural vibration period of the liquid has passed from the first time point, and
   wherein the second velocity is a velocity between the velocity of the electronic apparatus immediately before the first time point, and the first velocity.

6. The electronic apparatus of claim 1, wherein the processor is further configured to:
   measure the external forces exerted on the electronic apparatus based on the sensing data received through the sensor,
   predict a vibration of the liquid in the container by the measured external forces, and input the driving signal which causes the velocity of the electronic apparatus to change in order to reduce the predicted vibration, into the driving unit.

7. The electronic apparatus of claim 1, wherein the processor is further configured to:
identify a road surface condition of the ground based on the sensing data received through the sensor,
identify an optimal velocity of the electronic apparatus that minimizes a vibration of the liquid among a plurality of velocities based on the road surface condition, and
input the driving signal which causes the electronic apparatus to move at the identified optimal velocity, into the driving unit.

8. The electronic apparatus of claim 7, wherein the processor is further configured to:
based on the electronic apparatus moving at the plurality of velocities on the ground, identify each of the external forces exerted on the electronic apparatus based on the identified road surface condition,
identify the size of the frequency having frequency characteristics corresponding to the natural vibration frequency among the identified external forces, and
identify a smallest velocity among the plurality of velocities according to the identified frequency.

9. A traveling method of an electronic apparatus for transporting a liquid, the traveling method comprising:
based on sensing data received through a sensor, measuring, at a predetermined time interval, external forces exerted on the electronic apparatus from a ground on which the electronic apparatus is located;
identifying, based on frequency characteristics of the external forces and a natural vibration frequency of the liquid contained in a container, a frequency having frequency characteristics corresponding to the natural vibration frequency among frequencies of the external forces; and
based on a size of the identified frequency, controlling a velocity of the electronic apparatus according to a natural vibration period of the liquid.

10. The method of claim 9, wherein the identifying the frequency comprises performing a Fast Fourier Transform (FFT) to the measured external forces at the predetermined time interval, and identifying the frequency having a frequency within a predetermined range from the natural vibration frequency among the frequencies of the external forces.

11. The method of claim 9, wherein the controlling the velocity comprises, based on the size of the identified frequency being greater than or equal to a predetermined value, changing the velocity of the electronic apparatus according to the natural vibration period of the liquid.

12. The method of claim 11, wherein the changing the velocity comprises, based on the size of the identified frequency being greater than or equal to the predetermined value, identifying a time point of a velocity change of the electronic apparatus based on the natural vibration frequency of the liquid, and changing the velocity of the electronic apparatus at the identified time point of the velocity change.

13. The method of claim 12, wherein the changing the velocity comprises:
based on the size of the identified frequency being less than the predetermined value, changing the velocity of the electronic apparatus to a first velocity at a first time point; and
based on the size of the identified frequency being greater than or equal to the predetermined value, changing the velocity of the electronic apparatus to a second velocity at the first time point, and to the first velocity at a second time point after the first time point, and
wherein the second time point is a time point when a half of the natural vibration period of the liquid has passed from the first time point, and
wherein the second velocity is a velocity between the velocity of the electronic apparatus immediately before the first time point, and the first velocity.

14. The method of claim 9, further comprising:
measuring the external forces exerted on the electronic apparatus based on the sensing data received through the sensor;
predicting a vibration of the liquid in the container by the measured external forces; and
changing the velocity of the electronic apparatus to reduce the predicted vibration.

15. The method of claim 9, further comprising:
identifying a road surface condition of the ground based on the sensing data received through the sensor;
identifying an optimal velocity of the electronic apparatus that minimizes the predicted vibration of the liquid among a plurality of velocities based on the road surface condition; and
changing the velocity of the electronic apparatus to the identified optimal velocity.

* * * * *